United States Patent Office 2,971,918
Patented Feb. 14, 1961

2,971,918
PAINT STRIPPER COMPOSITION

Henry A. Goldsmith, Detroit, and Benjamin Ray, Dearborn, Mich., assignors to Solventol Chemical Products, Inc., Detroit, Mich., a corporation of Michigan No Drawing. Filed Jan. 7, 1957, Ser. No. 632,651

5 Claims. (Cl. 252—135)

This invention relates to improvements in the art of stripping paint from metal surfaces and more particularly to an improved paint stripping composition.

High resin concentration paints such as are presently used for some automotive and refrigerator finishes are particularly resistant to stripping by conventional alkali paint stripping compositions and accordingly important objects of the present invention are to provide a paint stripping composition which is useful in stripping all paints that are subject to alkali attack and which is particularly advantageous for the stripping of high resin concentration paints; to provide an improved paint stripping composition in the form of a free-flowing dry powder which may be inexpensively packaged for shipment and sale and which is readily soluble in water for use; and to provide a paint stripping composition of the type specified which, in certain forms, is effective in accelerating the stripping of paint from widely different metal surfaces including those which are susceptible to attack by caustic solutions.

The above and related objects of the invention will appear more fully during the course of the following description considered in its entirety.

The paint stripping ability of caustic soda solutions as well as their limitations are well known and it is also known that various materials have been proposed for incorporation in caustic soda solutions in an attempt to improve their paint stripping ability. For example it has been suggested to add cresylic acid to a bath of sodium hydroxide for immersion treatment of steel surfaces for paint removal.

In accordance with the present invention it has now been found that a superior paint stripping composition in contrast to that heretofore proposed results from the combination of specific chlorinated phenols and certain alkali compounds in well defined proportions. Such combination is at least as effective as caustic alkali in stripping of paints in general and quite superior for the stripping of high resin concentration paints which are difficult to strip with prior caustic alkali compositions. Moreover, by a selection of the proportions of the ingredients, the combination is multi-purpose in its function in that it is useful for stripping paint from caustic sensitive metal surfaces and other metal surfaces as well.

The chlorinated phenols which have been found to be suitable for admixture with one or more alkali compounds as hereinafter defined to make up the paint stripping combination of the present invention are the alkali soluble, ring chloro-substitution products of:

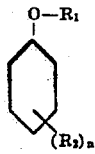

wherein $R_1$ is a radical selected from the group consisting of hydrogen, sodium and potassium; wherein $R_2$ is a radical selected from the group consisting of alkyl, phenyl, alkyl-phenyl, hydroxy phenyl, phenyl-alkyl, and hydroxy phenyl-alkyl and in which the alkyl radical contains 1 to 5 carbon atoms inclusive; and wherein $n$ represents a number from 0 to 3 inclusive. Specific examples of chlorinated phenols within the above definition suitable for the purposes of the present invention are: tri-chlorophenol, tetra-chlorophenol, pentachlorophenol, chloroxylenol, chlorocresol, and methylene bis(tri-chlorophenol) and sodium and potassium salts thereof. Commercial mixtures of one or more chlorinated phenols within the above definition, such as Dowicide 7, a trade name, are further examples of suitable chlorinated phenols which may be employed in the practice of the invention. Still further examples of suitable chlorinated phenols within the above definition will appear hereinafter. Within the above definition the preferred chlorinated phenols from the standpoint of paint stripping action are those selected from the group consisting of dichloro phenol, tri-chloro phenol, tetra-chloro phenol, penta-chloro phenol, chlorophenylphenol, and sodium and potassium salts thereof and which group includes commercial mixtures containing the recited chlorinated phenol as the major constituent thereof. It will be appreciated that when one or more of the specified chlorinated phenol compounds is combined with the alkali compound to be hereinafter defined, the two may react to form the corresponding sodium or potassium salt which may thus be present even though not added as such.

The alkali compound which must be present in combination with the chlorinated phenols above specified will be selected from the group consisting of caustic and a water soluble alkali metal silicate depending upon the metal surface to be treated. For stripping paint from metal surfaces such as iron and steel which are relatively immune to caustic attack, the alkali compound may be simply caustic which term includes caustic soda and caustic potash. As will appear as much as half of the required amount of caustic may be successfully replaced by soda ash, which is a diluent. For stripping paint from alkali sensitive metals such as aluminum, the caustic may be replaced in whole or in part by water soluble alkali metal silicates. Examples of a suitable water soluble alkali metal silicate are sodium metasilicate and sodium disilicate. Wetting agents such as soap, sulphonated detergents, tall oil or rosin soaps may be incorporated in the dry powder mixtures of the invention and similarly dispersing agents such as lignin sulphonate without departing from the invention.

One or more of the specified chlorinated phenols and alkali compounds to make up the essentially dry solid composition of the invention must be admixed in the proportion of 4 parts by weight of one or more of the specified chlorinated phenols to from 400 parts to 1 part by weight of one or more alkali compounds selected from the group consisting of caustic and a water soluble alkali metal silicate. It should be noted that these proportions are not on an anhydrous basic but rather include the moisture content which the several ingredients normally contain. The caustic compound is preferably caustic alkali alone for stripping paint from surfaces of iron, steel, copper and nickel and alloys thereof and from other similar metal surfaces which are relatively insensitive to caustic attack. For stripping paint from surfaces of aluminum and aluminum-base alloys, the caustic is preferably replaced by one or more of the water soluble alkali metal silicates. For zinc, tin and lead and alloys thereof both caustic and the alkali metal silicates are preferably present with the latter in major amounts.

In use of the composition of the invention the dry solid powder, granules, flakes, etc. may be dissolved in water to any concentration suitable for stripping paint dependent upon the particular application. For example, the dry powder may be mixed with water to form a solution or a paste and as illustrative may be added in amounts between 3% and 65% by weight of powder to the total weight of the aqueous mixture. In this connection a concentrated paint stripping mixture of dry powder and water in amounts from 55% to 65% by weight of the powder has been found to be excellent for stripping high resin concentration paints where extremely short processing times are required. The painted article from which the paint is to be stripped is usually immersed in a bath of an aqueous solution of the dry powder which may be maintained at elevated temperatures. In the case of ferrous metal surfaces and other metal surfaces which are relatively resistant to caustic attack the aqueous solution may be maintained at or near its boiling point when the article to be stripped is immersed therein. In the case of aluminum and other caustic sensitive metals the bath is preferably maintained below its boiling point usually in the range of about 180° F.

In cases where immersion of the article to be stripped is impractical and in other cases the aqueous mixture may be applied by spraying or other suitable ways. After the stripping operation the metal surface may be rinsed as desired. The aqueous mixture in the form of a solution or paste may also be used for refinishing painted articles by first removing the paint from the surface thereof as above described and thereafter neutralizing the alkaline ingredients which may adhere to the stripped surface with a suitable acid such as phosphoric acid before repainting.

The following examples will serve to illustrate the method and composition of the invention in greater detail. The composition of each example is an essentially dry powder and this has been found to be the case even at the higher concentration of the chlorinated phenols. Where not specified the various solutions were maintained approximately at their boiling points when contacted with the painted metal surface to be stripped. In the examples, penta-chlorophenol sodium salt (Dowicide G) indicates that a commercial mixture was used, the principal ingredient of which is the chlorinated phenol recited and similarly for all of the other chlorinated phenols in connection with which a trade name is mentioned. To illustrate, Dowicide 7, a product of Dow Chemical Company, has the composition: 83% penta-chlorophenol, 12% other chlorophenols and 5% inert ingredients.

EXAMPLE I

Parts/weight
Caustic soda _____ 80
Penta-chlorophenol sodium salt (Dowicide G) _____ 20

EXAMPLE II

Parts/weight
Caustic soda _____ 80
Tetra-chlorophenol sodium salt (Dowicide F) _____ 20

EXAMPLE III

Parts/weight
Caustic soda _____ 80
Tri-chlorophenol sodium salt (Dowicide B) _____ 20

Dry powder compositions consisting of caustic and of a chlorinated phenol as specified in the examples above were prepared and dissolved in water to form aqueous solutions containing 6% and 12% by weight of the dry powder composition.

For comparative purposes, two solutions, one of 100% caustic in water and another 80% caustic and 20% cresylic acid in water were prepared at 6% and 12% concentrations.

Steel articles coated with high melamine concentration light blue pigmented automotive finish and baked at 320° F. were immersed in the 6% and 12% solutions made from each of the above examples and the comparative solutions at their boiling point and were subsequently rinsed with cold water.

The results are as follows:

Table 1

| Solution | Concentration | |
|---|---|---|
| | 6% | 12% |
| Example: | | |
| I | Softened in 20 minutes and stripped after 30 minutes. | Stripped after 6 minutes. |
| II | Stripped in 30 to 33 minutes. | Stripped in 6 to 7 minutes. |
| III | | Stripped in 14 to 15 minutes. |
| Caustic soda | No effect after 20 minutes and not stripped after 30 minutes. | Softened but not stripped after 20 minutes. |
| Caustic soda and Cresylic acid. | | Softened but not stripped after 20 minutes. |

Steel articles similar to the above and painted with the same paint but which was baked on at 275° F. were treated in 6% and 12% solutions made from the compositions set forth in the following examples. Identical articles were treated in the comparative solutions above at 12% concentration.

EXAMPLE IV

Parts/weight
Caustic soda _____ 80
Penta-chlorophenol (Dowicide 7) _____ 20

EXAMPLE V

Parts/weight
Caustic soda _____ 80
2,2'-methylene bis (3,4,6-trichlorophenol) (hexachlorophene, Sindar) _____ 20

Results are tabulated in the table below:

Table 2

| Solution | Concentration | |
|---|---|---|
| | 6% | 12% |
| Example: | | |
| IV | Stripped after 15 minutes. | Stripped after 5 minutes. |
| V | | Stripped in 8 to 9 minutes. |
| Caustic soda | | Blistered after 15 minutes; not stripped after 20 minutes. |
| Caustic soda and Cresylic acid. | | Blistered but not stripped after 13 minutes; stripped after 18 minutes. |

Articles painted with a very difficultly removable epoxy resin enamel used on refrigerators were treated in a 12% aqueous solution made up from 70% caustic soda and 30% cresylic acid and in a 12% solution from the following composition:

EXAMPLE VI

Parts/weight
Caustic soda _____ 70
Tetra-chlorophenol (Dowicide 6) _____ 30

The results are recorded in the following table:

Table 3

| Solution | Concentration, 12% |
|---|---|
| Example VI | Film broken up in 20 minutes and stripped in 30 minutes. |
| Caustic soda and cresylic acid | Film unbroken and not stripped after 30 minutes. |

A 55% aqueous solution made up from the composition of Example IV was used to treat articles identical to those just mentioned painted with the refrigerator enamel as described and the paint film was stripped in this solution in two to three minutes.

Steel articles painted with an even more difficult to strip refrigerator enamel which was a mixture of epoxy and melamine resins (70% "Epon" 1007 and 30% "Beetle" Z16-8) were treated with 12% and 20% solutions made up respectively from the composition of Example IV, 100% caustic, and 80% caustic together with 20% cresylic acid and from the following composition:

EXAMPLE VII

| | Parts/weight |
|---|---|
| Caustic soda | 60 |
| Penta-chlorophenol (Dowicide 7) | 40 |

The results are as follows:

Table 4

| Solution | Concentration | |
|---|---|---|
| | 12% | 20% |
| Example: | | |
| IV | Film softened but not stripped in 1 hour. | Film softened and broken in 1 hour. |
| VII | do | Do. |
| Caustic soda | No effect in 1 hour | Slight softening after 1 hour. |
| Caustic soda and Cresylic acid. | do | Do. |

The above treated surfaces were observed after drying overnight and the films on the surfaces treated with the solutions made up from Examples IV and VII disintegrated upon contact and were removable with slight rubbing. The films on the surfaces treated with solutions of caustic and caustic with cresylic acid remained intact.

The following compositions were prepared:

EXAMPLE VIII

| | Parts/weight |
|---|---|
| Penta-chlorophenol sodium salt (Dowicide G) | 10 |
| Sodium metasilicate pentahydrate | 76 |
| "G Brand" sodium disilicate (19.4% Na$_2$O, 62.5% SiO$_2$, 17.5% H$_2$O), a product of Philadelphia Quartz Company | 9.5 |
| Sodium dodecylbenzene sulphonate (85%), identified as "Ultrawet K," a product of Atlantic Refining Company | 4.5 |

EXAMPLE IX

| | Parts/weight |
|---|---|
| Penta-chlorophenol sodium salt (Dowicide G) | 10 |
| Sodium metasilicate pentahydrate | 80 |
| "G Brand" sodium silicate (as above) | 10 |

Solutions were prepared having concentrations of 6% and 12% from the dry powder compositions of Examples VIII and IX by dissolving them in required quantities of water. A composition was also prepared by modifying that of Example VIII in that the chlorinated phenol was omitted therefrom. A 6% solution was prepared from this modified composition. The solutions prepared as described were then heated to 180° F. and aluminum articles painted with alkyd resin paint were immersed in these solutions for the times indicated in the following table of results.

Table 5

| Solution | Concentration | |
|---|---|---|
| | 6% | 12% |
| Example: | | |
| VIII | Blistered in 5 minutes and nearly completely stripped in 12 minutes. | Nearly completely stripped in 3 minutes. |
| IX | Blistered in 6 minutes and completely stripped in 15 minutes. | Completely stripped in 3 minutes. |
| Modified VIII | No effect | |

EXAMPLE X

Steel articles painted with automotive finish turquoise pigmented high-melamine resin base enamel were treated in a 12% concentration solution made up from the following composition:

| | Parts/weight |
|---|---|
| Caustic soda | 45 |
| Soda ash | 45 |
| Penta-chlorophenol sodium salt (Dowicide G) | 10 |

The treating solution was maintained approximately at its boiling point and the paint was stripped from the surfaces of the articles in 10 to 11 minutes. This compares to a stripping time of 18–22 minutes for caustic soda alone without the chlorinated phenol and a stripping time of 33–38 minutes for half caustic soda and half soda ash without the chlorinated phenol under the same conditions.

Aqueous solutions of 12% concentration were prepared from 100% caustic soda and each of the compositions set forth in the following examples and steel articles painted with the same automotive finish as in Example X were immersed in these solutions.

EXAMPLE XI

| | Parts/weight |
|---|---|
| Caustic soda | 99.0 |
| Penta-chlorophenol sodium salt (Dowicide G) | 1.0 |

EXAMPLE XII

| | Parts/weight |
|---|---|
| Caustic soda | 98.0 |
| Penta-chlorophenol sodium salt (Dowicide G) | 2.0 |

EXAMPLE XIII

| | Parts/weight |
|---|---|
| Caustic soda | 90.0 |
| Penta-chlorophenol sodium salt (Dowicide G) | 10.0 |

EXAMPLE XIV

| | Parts/weight |
|---|---|
| Caustic soda | 75.0 |
| Penta-chlorophenol sodium salt (Dowicide G) | 25.0 |

EXAMPLE XV

| | Parts/weight |
|---|---|
| Caustic soda | 50 |
| Penta-chlorophenol sodium salt (Dowicide G) | 50 |

EXAMPLE XVI

| | Parts/weight |
|---|---|
| Caustic soda | 25 |
| Penta-chlorophenol sodium salt (Dowicide G) | 75 |

Table 6

| Example: | Time in minutes |
|---|---|
| 100% Caustic soda | 18–22 |
| XI | 13–14 |
| XII | 11 |
| XIII | 6 |
| XIV | 7 |
| XV | 6 |
| XVI | 8–11 |

From 100% caustic soda and each of the following compositions 12% aqueous solutions were prepared for immersion treatment of steel articles painted as above.

EXAMPLE XVII

| | Parts/weight |
|---|---|
| Caustic soda | 90 |
| p-Chlorometacresol | 10 |

EXAMPLE XVIII

| | Parts/weight |
|---|---|
| Caustic soda | 90 |
| 2-chloro, 4-phenylphenol (Dowicide 4) | 10 |

EXAMPLE XIX

| | Parts/weight |
|---|---|
| Caustic soda | 90 |
| o-Benzyl p-chlorophenol (Santophen 1, a trade name) | 10 |

EXAMPLE XX

| | Parts/weight |
|---|---|
| Caustic soda | 90 |
| p-Chlorophenol | 10 |

EXAMPLE XXI

| | Parts/weight |
|---|---|
| Caustic soda | 90 |
| 2,4 dichlorophenol | 10 |

The time required in each of the above solutions to completely strip the paint film was observed and is listed in the following table.

Table 7

| Example: | Time in minutes |
|---|---|
| 100% caustic soda | 18–22 |
| XVII | 13–14 |
| XVIII | 6 |
| XIX | 6 |
| XX | 10–12 |
| XXI | 8–9 |

What is claimed is:
1. A paint stripping composition in the form of a substantially dry free-flowing particulated mixture consisting essentially of at least one chlorinated phenol, said chlorinated phenol being an alkali soluble ring chloro-substitution product of:

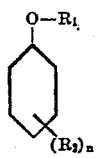

wherein $R_1$ is a radical selected from the group consisting of hydrogen, sodium and potassium; wherein $R_2$ is a radical selected from the group consisting of an alkyl, phenyl, alkyl-phenyl, hydroxy phenyl, phenyl-alkyl, and hydroxy phenyl-alkyl and in which the alkyl radical contains 1 to 5 carbon atoms inclusive; and wherein $n$ represents a number from 0 to 3 inclusive, and at least one alkali compound selected from the group consisting of an alkali metal hydroxide and an alkali metal silicate, said chlorinated phenol and said alkali compound being present in the proportion of 4 parts by weight of said chlorinated phenol to from 400 parts to 1 part by weight of said alkali compound.

2. A paint stripping composition in the form of a substantially dry free-flowing particulated mixture consisting essentially of at least one chlorinated phenol, said chlorinated phenol being an alkali soluble ring chloro-substitution product of:

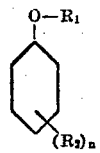

wherein $R_1$ is a radical selected from the group consisting of hydrogen, sodium and potassium; wherein $R_2$ is a radical selected from the group consisting of an alkyl, phenyl, alkyl-phenyl, hydroxy phenyl, phenyl-alkyl, and hydroxy phenyl-alkyl and in which the alkyl radical contains 1 to 5 carbon atoms inclusive; and wherein $n$ represents a number from 0 to 3 inclusive, and an alkali metal hydroxide, said chlorinated phenol and said caustic being present in the proportion of 4 parts by weight of said chlorinated phenol to from 400 parts to 1 part by weight of said caustic.

3. A paint stripping composition in the form of a substantially dry free-flowing particulated mixture consisting essentially of at least one chlorinated phenol, said chlorinated phenol being an alkali soluble ring chloro-substitution product of:

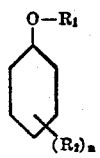

wherein $R_1$ is a radical selected from the group consisting of hydrogen, sodium and potassium; wherein $R_2$ is a radical selected from the group consisting of an alkyl, phenyl, alkyl-phenyl, hydroxy phenyl, phenyl-alkyl, and hydroxy phenyl-alkyl and in which the alkyl radical contains 1 to 5 carbon atoms inclusive; and wherein $n$ represents a number from 0 to 3 inclusive, and at least one water soluble alkali metal silicate, said chlorinated phenol and said alkali metal silicate being present in the proportion of 4 parts by weight of said chlorinated phenol to from 400 parts to 1 part by weight of said alkali metal silicate.

4. The method of stripping paint which comprises subjecting a painted article to the action of a heated aqueous mixture consisting essentially of water, at least one chlorinated phenol, said chlorinated phenol being an alkali soluble ring chloro-substitution product of:

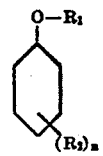

wherein $R_1$ is a radical selected from the group consisting of hydrogen, sodium and potassium; wherein $R_2$ is a radical selected from the group consisting of an alkyl, phenyl, alkyl-phenyl, hydroxy phenyl, phenyl-alkyl, and hydroxy-phenyl-alkyl and in which the alkyl radical contains 1 to 5 carbon atoms inclusive; and wherein $n$ represents a number from 0 to 3 inclusive, and at least one alkali compound selected from the group consisting of an alkali metal hydroxide and an alkali metal silicate, said chlorinated phenol and said alkali compound being present in the proportion of 4 parts by weight of said chlorinated phenol to from 400 parts to 1 part by weight of said alkali compound, said chlorinated phenol and said alkali together constituting from about 3% to about 65% of said mixture.

5. A paint stripping composition in the form of a substantially dry free-flowing particulated mixture consisting essentially of at least one chlorinated phenol selected from the group consisting of dichloro phenol, tri-chloro phenol, tetrachloro phenol, penta-chloro phenol, chlorophenyl-phenol, and sodium and potassium salts thereof, and at least one alkali compound selected from the group consisting of an alkali metal hydroxide and an alkali metal silicate, said chlorinated phenol and said alkali compound being present in the proportion of 4 parts of said chlorinated phenol to from 400 parts to 1 part by weight of said alkali compound.

References Cited in the file of this patent

UNITED STATES PATENTS

| 1,744,463 | Gravell | Jan. 21, 1930 |
| 2,086,336 | Raiziss | July 6, 1937 |
| 2,221,808 | Mills | Nov. 19, 1940 |

(Other references on following page)

FOREIGN PATENTS

| | | |
|---|---|---|
| 10,497 | Great Britain | 1914 |
| 360,472 | Great Britain | Nov. 6, 1931 |

OTHER REFERENCES

Vail, James G.: Soluble Silicates, Their Properties and Uses, vol. 2, pp. 220 and 221, Reinhold Pub. Co., N.Y. 1952.

Wood Preservation During That Last Fifty Years, by Van Groenou, Rischen, and Van Den Berge, pub. by A. W. Sijthoff's Vitgeversmaatschappij N.V., Leiden, Holland (195), pages 185–187.

Dictionary of Organic Compounds, Heilbron, Oxford Univ. Press, N.Y. (1953), vol. I, page 550.